June 4, 1929.  J. M. LARSH  1,716,233
VEHICLE LEVELING MECHANISM
Filed July 26, 1927  2 Sheets-Sheet 1
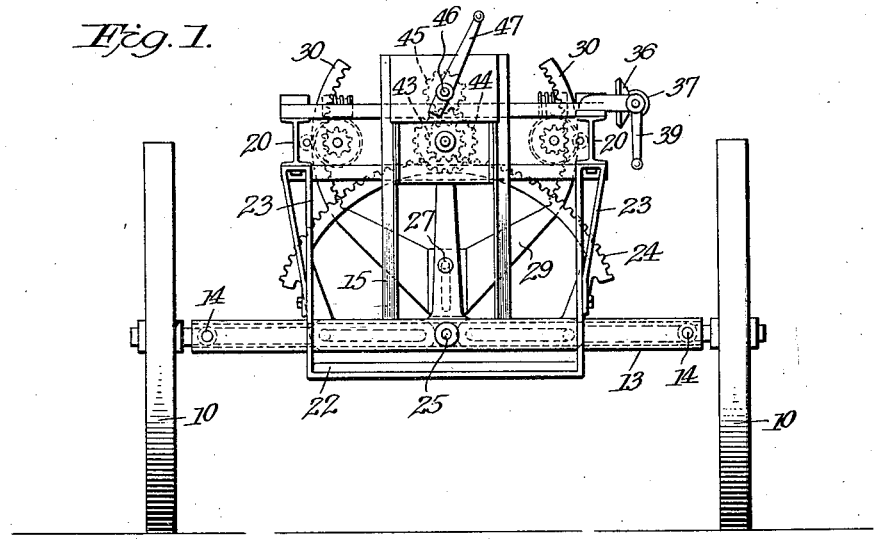
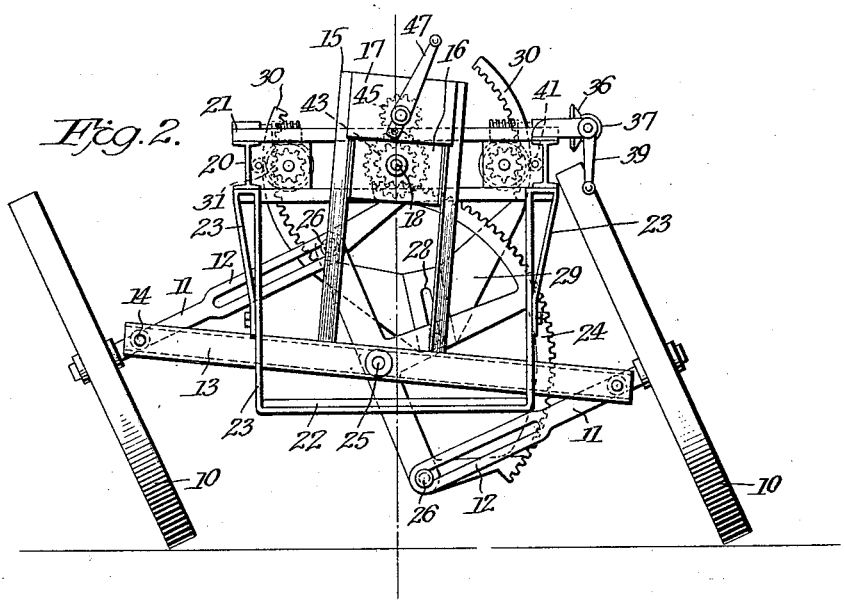
Inventor
John M. Larsh,
By
Attorney June 4, 1929.  J. M. LARSH  1,716,233
VEHICLE LEVELING MECHANISM
Filed July 26, 1927  2 Sheets-Sheet 2
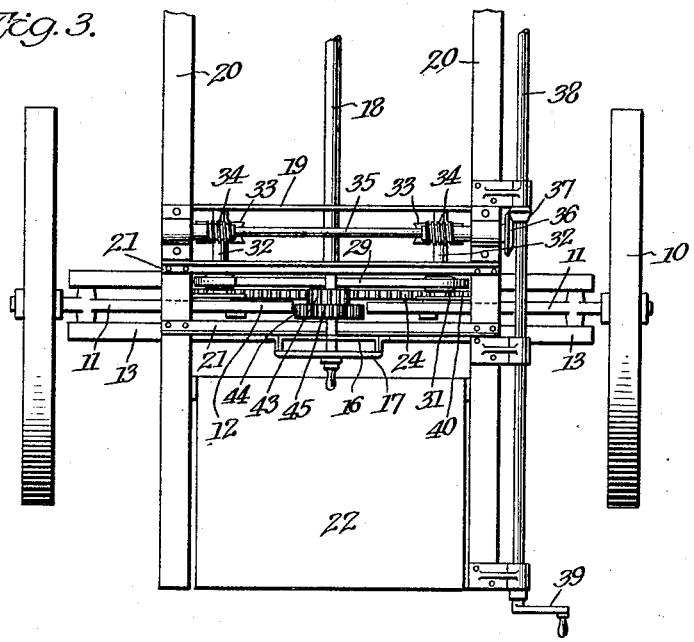
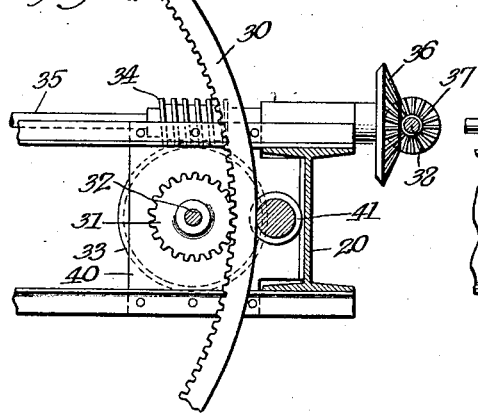
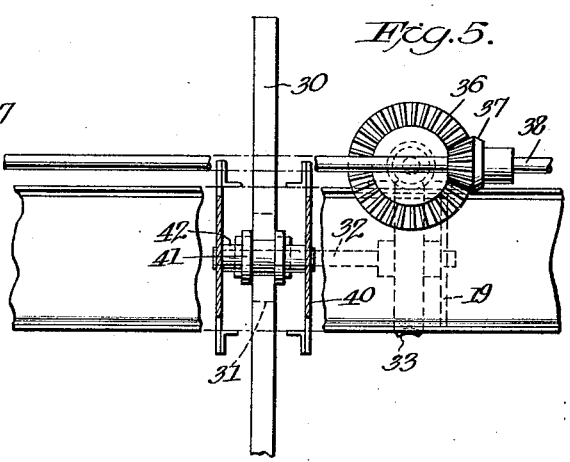
Inventor
John M. Larsh
By
Attorney Patented June 4, 1929.

1,716,233

UNITED STATES PATENT OFFICE.

JOHN M. LARSH, OF INDIANAPOLIS, INDIANA.

VEHICLE LEVELING MECHANISM.

Application filed July 26, 1927. Serial No. 208,587.

This invention is an improvement over that shown in my Patent No. 1,363,327, patented December 28, 1920, and relates to adjustable mechanism for leveling or maintaining in horizontal position the top frame and operator's platform suspended therefrom of a road grading machine or other machine used in road construction work when the wheels are canted or tilted on a level surface in order to move sidewise a heavier load of earth than the weight of the machine, all as will be hereinafter more fully described and claimed.

Referring to the accompanying drawings which are made a part hereof and on which similar reference characters indicate similar parts, Figure 1 is a rear end elevation of a machine illustrating the application of my invention.

Figure 2 is a similar view showing the wheels canted or tilted with the top frame and operator's platform adjusted to horizontal position.

Figure 3 is a top plan view of the structure shown in Fig. 1.

Figure 4 is a fragmentary transverse section, and,

Figure 5 is a side elevation of the structure shown in Fig. 4 with a part broken away.

In the drawings reference character 10 indicates a pair of supporting wheels mounted on spindles 11 terminating in slotted arms 12 which extend inwardly toward the longitudinal center of the apparatus. To the spindles 11 an axle 13 is pivoted at 14, said axle comprising spaced parallel axle bars which afford clearance for the movable slotted extremities 12 of the spindles. To the axle 13 are fixed spaced uprights 15 connected adjacent their upper ends by inner and outer plates 16 and 17 respectively, mounted rigidly relative to said axle. The shaft 18 extends through alined openings in the plates 16, 17 and transversely disposed plate 19 which has its ends attached to side members 20 of the top frame and said shaft forms a pivotal support for the top frame and operator's platform.

The top frame comprises a pair of spaced parallel side members 20 connected by the transverse plate 19, as just described, and upper and lower sets of cross members 21. Rearwardly of the rear axle 13 the rectangular frame is provided with an operator's platform 22 supported by straps 23, said platform being suspended a sufficient distance below the frame to render the movable parts of the device readily accessible.

A sector gear 24 is mounted on a pivot bolt 25 which extends transversely through the center of the bars which form the axle 13. Adjacent each end the sector gear has mounted thereon a fixed pin 26 which extends through the slotted portion 12 of the spindle 11 and forms a sliding connection therewith. The sector gear is also provided with an eccentrically mounted fixed pin 27 arranged to slide in a vertical slot 28 in the lower portion of a Y-shaped member 29. The free ends of the arms of the Y-shaped member extend upwardly and are curved and provided with teeth to form curved racks 30 for cooperation with pinions 31 by means of which the Y-shaped member may be shifted for leveling the platform or for adjusting the same to horizontal position.

As shown in Figs. 3 and 4, the pinions 31 are mounted upon a shaft 32 provided with a worm gear 33 which cooperates with a worm 34 mounted upon a shaft 35, said worm shaft having a bevel gear 36 in one end adapted to be operated by a cooperating bevel gear 37 on a shaft 38 operated by a crank 39 at the rear end of the vehicle adjacent the operator's platform. The shaft 32 is supported between parallel plates 40 mounted at each side of the frame members 20. The racks 30 are supported at their rear sides by a flanged wheel 41 supported upon a shaft 42 journaled in the plates 40.

The sector gear 24 engages a pinion 43 on the shaft 18 and an additional larger pinion 44 is also mounted on said shaft and is adapted to be rotated by a cooperating pinion 45 on a shaft 46 having a crank 47 on its extremity adjacent the platform 22. Upon the operation of the crank 47 the shaft 18 and sector gear are rotated whereupon the pins reciprocate in the slotted arms of the spindles 12 and tilt the wheels 10, as shown in Fig. 2. At the same time operation of the crank 37 will rotate the pinions 31 which engage the racks 30 of the Y-shaped member and move the top frame and operator's platform to horizontal position. Similar mechanism may be provided at the opposite or front end of the vehicle for operating the front wheels and for assisting in maintaining the body in proper position.

It will be obvious to those skilled in the art that various changes may be made in my device without departing from the spirit of my invention, and I, therefore, do not limit myself to what is shown in the drawings and described in the specification, but only as set forth in the appended claims.

Having thus fully described my said invention, what I claim as new and desire to secure by Letters Patent, is:

1. A vehicle comprising wheels, spindles for mounting the wheels, an axle pivoted on the intermediate portions of the spindles, a member pivoted to the central portion of the axle and having a sliding connection with each spindle, a frame fixed to the axle, a shaft mounted in said frame transversely of the axle and adapted to be rotated for oscillating the member for moving the wheels to inclined position, a body suspended from said shaft, a member eccentrically connected to said first-mentioned member and adjustably connected to said body, and means for varying the said adjustable connection with the body for maintaining the body in horizontal position, substantially as set forth.

2. A vehicle comprising wheels, spindles for mounting the wheels, an axle pivoted on the intermediate portions of the spindles, a member pivoted to the central portion of the axle and having a sliding connection with each spindle, a frame fixed to the axle, a shaft mounted in said frame transversely of the axle and adapted to be rotated for oscillating the member for moving the wheels to inclined position, a body suspended from said shaft, a Y-shaped member pivoted eccentrically of said first-mentioned member and having its extremities curved and provided with teeth forming racks, pinions carried by said body and engaging said racks, and means for rotating the pinions for oscillating the body on its supporting shaft for maintaining the same in horizontal position, substantially as set forth.

3. The combination in a vehicle having a sector gear connected to the wheel spindles for tilting the wheels and a pinion engaging said sector gear and carried by the body for maintaining the body parallel to the spindles, of a rack eccentrically pivoted to said sector gear, a pinion mounted on the vehicle frame, and means for rotating said pinion for varying the distance between said pinion and the point of pivotal connection between the rack and said sector gear, substantially as set forth.

In witness whereof, I have hereunto set my hand at Indianapolis, Indiana this 30th day of June, A. D. nineteen hundred and twenty-seven.

JOHN M. LARSH.